United States Patent [19]
Shimotsu

[11] Patent Number: 6,042,157
[45] Date of Patent: Mar. 28, 2000

[54] LOCK LEVER RELEASE FOR CONNECTOR

[75] Inventor: Akihiro Shimotsu, Tokyo, Japan

[73] Assignee: Hirose Electric Co., Ltd., Tokyo, Japan

[21] Appl. No.: 09/104,427

[22] Filed: Jun. 25, 1998

[30] Foreign Application Priority Data

Jul. 29, 1997 [JP] Japan ................................. 9-203171

[51] Int. Cl.[7] ................................................ E05C 19/06
[52] U.S. Cl. ........................... 292/83; 292/80; 292/87; 292/DIG. 38; 220/326
[58] Field of Search ............................ 292/80, 81, 87, 292/88, 89, 121, 128, DIG. 38, DIG. 16, 83; 220/324, 326

[56] References Cited

U.S. PATENT DOCUMENTS

| | | | |
|---|---|---|---|
| 3,313,564 | 4/1967 | Pultz | 292/87 |
| 3,522,963 | 8/1970 | Farnden | 929/83 |
| 3,769,718 | 11/1973 | Nopanen | 292/87 |
| 3,977,595 | 8/1976 | Hillgenberg | 292/87 |
| 4,730,731 | 3/1988 | Allison | 292/87 |
| 4,964,661 | 10/1990 | Cadwell et al. | 292/87 |
| 5,100,015 | 3/1992 | Vanderstuyf | 292/DIG. 38 |
| 5,348,356 | 9/1994 | Moulton | 292/80 |
| 5,577,779 | 11/1996 | Dangel | 292/80 |
| 5,853,205 | 12/1998 | Enomoto et al. | 292/DIG. 38 |

Primary Examiner—Teri Pham
Attorney, Agent, or Firm—Kanesaka & Takeuchi

[57] ABSTRACT

A slide-type lock lever release mechanism includes a slidable member (40) with a second acting surface slidable on the first acting surface of the lock lever (20) by a predetermined stroke for flexing the lock lever away from the second lock engaging member (211) to thereby release the engagement between the first and second lock engaging members, wherein at least one of the first and second acting surfaces having at least two acting surface sections (42, 43) such that a first acting surface section (42) is slidable on the other one of the acting surfaces (23) in a first segment of the predetermined stroke and a second acting surface section (43) is slidable on the other one (23) in a second segment of the predetermined stroke to thereby provide smooth release of the lock engagement with a relatively short stroke of the slidable means.

2 Claims, 2 Drawing Sheets

6,042,157

LOCK LEVER RELEASE FOR CONNECTOR

BACKGROUND OF THE INVENTION

1. Filed of the Invention

The present invention relates to slide-type lock lever release mechanisms for connectors.

2. Description of the Related Art

A connector, such as an electrical connector or optical connector, has at least one lock lever to lock plugging with a mating connector. The connector also has a lock release mechanism for releasing the lock of plugging. Japanese patent application Kokoku No. 22885/93 discloses such a lock lever release mechanism.

The lock mechanism is provided with a lock lever flexible to a side of the housing. The housing is provided with a slidable cover to cover the lock lever. The lock lever is provided near its base portion with an engaging member for engagement with the lock member of a mating connector to lock the plugging with the mating connector. A cam surface is provided on the lock lever far from the base portion. On the inside of the slidable cover there is provided an acting section with a flexing surface for engagement with the cam surface.

In such a lock lever release mechanism, when the slidable cover is slid with respect to the housing, the flexing surface of the slidable cover works on the cam surface of the lock lever so that the lock lever is flexed inwardly to release the engagement between the lock lever and the lock member of a mating connector.

In such a slide-type lock lever release mechanism, the flexing surface of the slidable cover and the cam surface of the lock lever have a single slope surface, respectively, so that when the slidable cover is slid, the flexing surface keep contact with the cam surface over the entire stroke of the slidable cover.

If a release force applied to the slidable cover for releasing the lock lever is large, it is possible to provide the acting surface of the slidable cover near the base portion of the lock lever. If it is desirable to minimize the release force, it is necessary to provide the acting surface of the slidable cover far from the base portion of the lock lever. However, when the acting surface of the slidable cover is provided far from the base portion of the lock lever, the stroke of the slidable cover must be sufficiently long to provide satisfactory lock release.

In recent electronic equipment industry there is a demand for high-density mounting of electronic components, and connectors for use in such electronic equipment are miniaturized. Consequently, the slide stroke must be minimized. On the other hand, it is requested that the lock release operation be made smoothly with a small force. It is difficult to meet such contradictory demands by means of the conventional slide-type lock lever release mechanism wherein the acting surfaces do not change in the entire slide stroke.

SUMMARY OF THE INVENTION

Accordingly, it is an object of the invention to provide a slide-type lock lever release mechanism which meets the above demands.

According to one aspect of the invention there is provided a slide-type lock lever release mechanism which comprises a lock lever with a first lock engaging member for engagement with a second lock engaging member of a mating connector to lock plugging with the mating connector and having a first acting surface at a front end thereof; and a slidable member with a second acting surface slidable on the first acting surface of the lock lever by a predetermined stroke for flexing the lock lever away from the second lock engaging member to thereby release the engagement between the first and second lock engaging members, wherein at least one of the first and second acting surfaces having at least two acting surface sections such that a first acting surface section is slidable on the other one of the acting surfaces in a first segment of the predetermined stroke and a second acting surface section is slidable on the other one in a second segment of the predetermined stroke to thereby provide smooth release of the lock engagement with a relatively short stroke of the slidable means.

According to another aspect of the invention, the acting surface of the slidable means comprises at least two slope surfaces having slope angles different to each other and the acting surface of the lock lever consists of a single slope surface.

According to still another aspect of the invention, the acting surface of the lock lever comprises at least two slope surfaces having slope angles different to each other and the acting surface of the slidable means consists of a single slope surface.

DESCRIPTION OF THE PREFERRED EMBODIMENT

Embodiments of the invention will be described with reference to the accompanying drawings.

Figure 1:
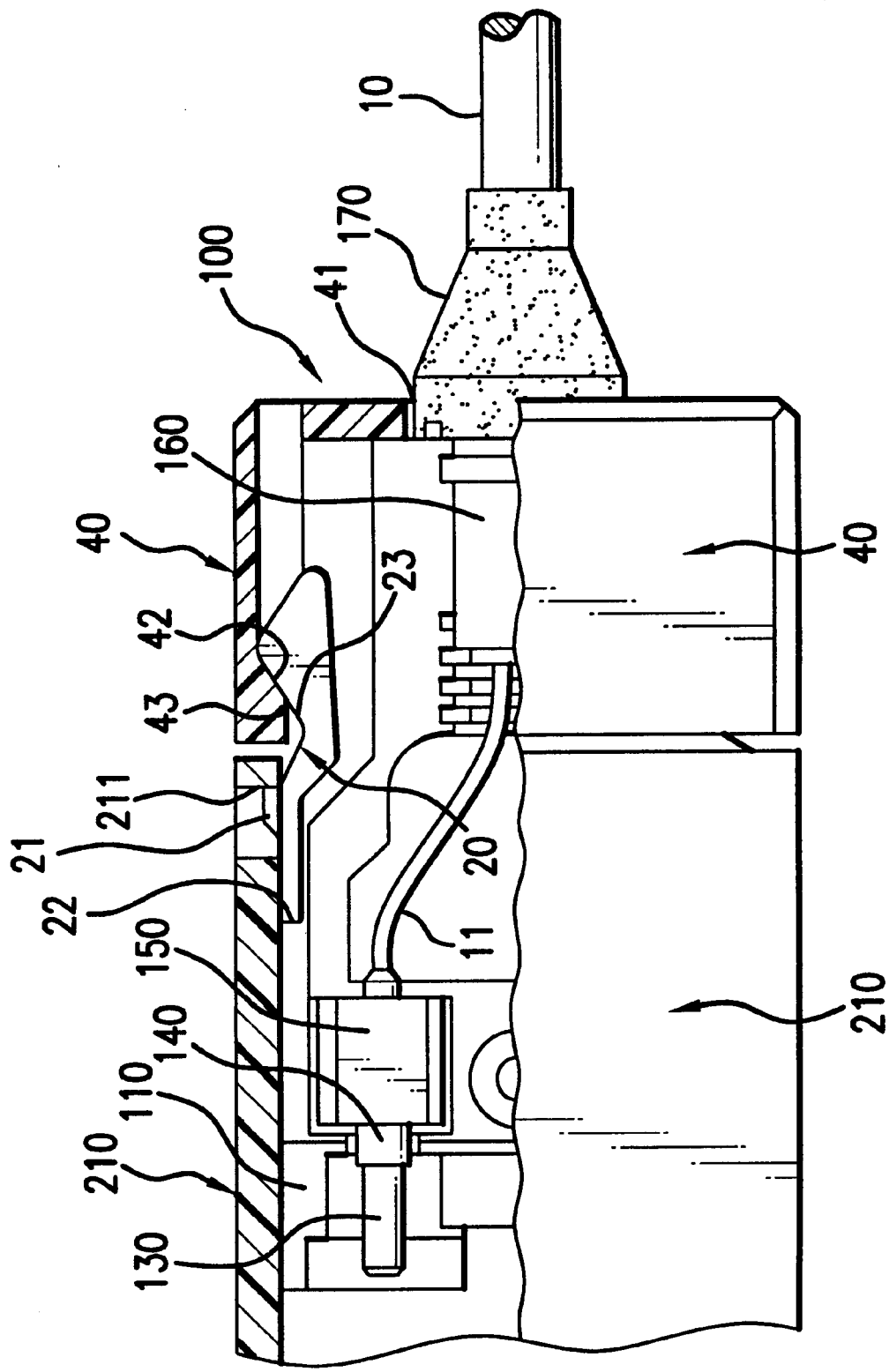
FIG. 1 is a partially sectional view of an optical connector locked with a mating connector by a slide-type lock lever release mechanism according to an embodiment of the invention.

FIG. 1 shows the plugging lock condition of an optical connector having a slide-type lock lever release mechanism according to an embodiment of the invention. An optical connector 100 includes a housing 110 made from a plastic and a plurality of ferrule holding bodies 150 mounted in the housing. Each ferrule holding body 150 holds a ferrule holder 140 for sliding movement. Each ferrule holder 140 holds a ferrule 130. The housing 110 is provided at the rear end with a cable clamp fixture 160 and a rubber hood 170 for pulling out an optical cable 10. The front end of a fiber 11 of the optical cable 10 is inserted in the ferrule 130 held by the ferrule holder 140.

The housing 110 is provided on opposite sides with a pair of lock levers 20 each having an engaging projection 21 for engagement with a notch 211 provided in the housing 210 of a mating connector to lock the plugging with the mating connector. A slidable cover 40 is mounted on the housing 110 for sliding movement to cover the lock levers 20. Each lock lever 20 is flexible inwardly from the side of the housing 110 at a base portion 22, and the engaging projection 21 extending outwardly from the outside of the lock lever 20 near the base portion 22. The cam surface 23 is provided on an acting section at the free end of the lock lever 20.

The slidable cover 40 has a front opening so that when it is attached to the housing 110, it covers the acting sections at the free ends of the lock levers 20. The slidable cover 40 is provided at the rear end with an opening 41 for passing the rubber hood 170 which surrounding the optical cable 10. Flexing surfaces 42 and 43 are provided on the insides of opposite side walls of the slidable cover 40 for engagement with the cam surfaces 23 of the lock levers 20 when the slidable cover 20 is attached to the rear end of the housing 110.

Figure 2:
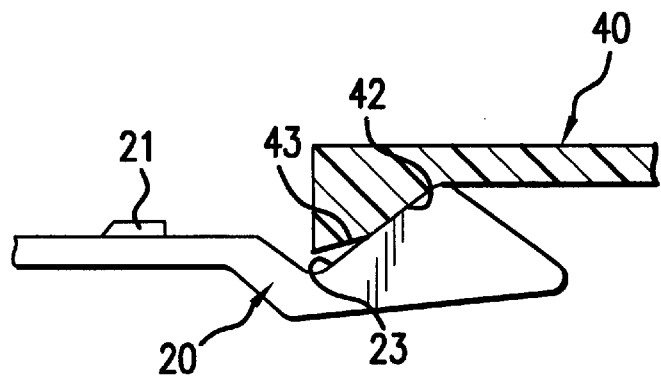
FIG. 2 is an enlarged view of a lock lever and a slidable cover of the lock lever release mechanism.

FIG. 2 shows the lock lever 20 and the slidable cover 40 of the optical connector 100. The cam surface 23 of each lock lever 20 has a single slope surface having a predetermined angle. The first and second flexing surfaces 42 and 43 of the slidable cover 40 have different sloping angles to each other. Specifically, the first flexing surface 42 has a sloping angle substantially equal to the sloping angle of the cam surface 23 of the lock lever 20, and the second flexing surface 43 has a sloping angle less steep than the sloping angle of the first flexing surface 42.

Figure 3:
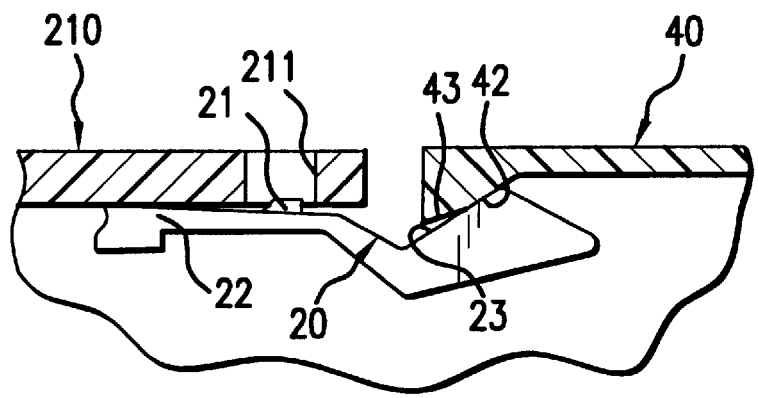
FIG. 3 is an enlarged view of the lock lever release mechanism in the earlier stage of a lock release operation.

The operation of such a slide-type lock lever release mechanism will be described with respect to FIGS. 3 and 4. In FIG. 1, the engaging projections 21 of the lock lever 20 engage the notches 211 of the housing 210 of a mating connector to lock the plugging of the mating connector with the optical connector 100. In FIG. 3, when the slidable cover 40 is slid rearwardly to release such a lock condition, the flexing surfaces 42 of the slidable cover 40 act on the cam surfaces 23 of the lock levers 20 on the early stage of the sliding stroke so that the lock levers 20 are flexed inwardly at the base portions 22, starting disengagement of the engaging projections 21 from the notches 211 of the mating connector.

The acting points at which the first flexing surfaces 42 act on the cam surfaces 23 are relatively far from the base portions 22 so that a release force applied to the slidable cover 40 is relatively small.

Figure 4:
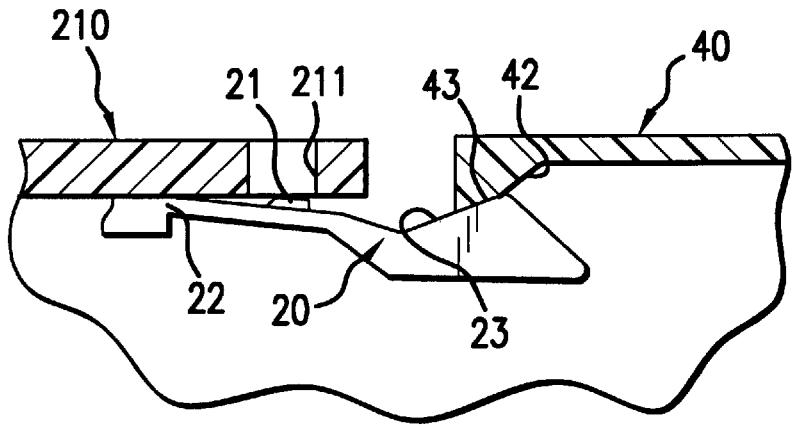
FIG. 4 is an enlarged view of the lock lever release mechanism in the later stage of the lock release operation.

In FIG. 4, when the slidable cover 40 is slid further rearwardly, the second flexing surfaces 43 come to contact the cam surfaces 23 to flex the lock levers 20 more inwardly. Consequently, the engaging projections 21 of the lock lever 20 are disengaged completely from the notches 211 of the mating connector. The sliding stroke of the slidable cover 40 is restricted to this point by a stopper (not shown) of the housing 110 so that a further pull of the slidable cover 40 separates the optical connector 100 from the mating connector.

In the later stage of the sliding stroke, the lock levers 20 are flexed inwardly by the second flexing surfaces 43 so that the acting point is not far from the base portions 22. Consequently, the lock release is made with one pulling operation without a subsequent long stroke of the slidable cover 40 or a long slope surface of the lock lever 20.

Alternatively, the acting surfaces of the slidable cover 40 may be composed of three or more flexing surface sections having different angles.

Alternatively, the acting surfaces of the slidable cover 40 may be composed of a single moving slope surface and the acting surfaces of the lock levers 20 may be composed of two or more cam surfaces having different angles.

The lock release force and the length of stroke for releasing the lock are selectable relatively freely so that an appropriate slide-type lock lever release mechanism is made according to the use of the connector.

In other words, the lock release force is reduced to provide soft lock release operation with the shortest stroke so that it is possible to provide a high-density mounting connector.

What is claimed is:

1. A slide-type lever release mechanism comprising:

a lock lever having a base section at front end thereof, a first lock engaging member provided relatively close to said base section for engagement with a second lock engaging member of a mating connector to lock plugging with the mating connector and a first acting surface at a rear end thereof; and slidable means with a second acting surface slidable on said first acting surface of said lock lever by a predetermined stroke for flexing said lock lever at said base section away from said second lock engaging member to thereby release said engagement between said first and second lock engaging members, wherein said first acting surface of said lock lever consists of a single sloping surface and, said second acting surface of said slidable means comprises at least two sloping surfaces having slope angles different to each other; a first sloping surface having a slope angle substantially identical to that of said first acting surface of said lock lever and a second sloping surface having a slope angle less than that of said first sloping surface, thus providing at least two acting surface sections.

2. A slide-type lever release mechanism comprising:

a lock lever having a base section at front end thereof, a first lock engaging member provided relatively close to said base section for engagement with a second lock engaging member of a mating connector to lock plugging with the mating connector and a first acting surface at a rear end thereof; and slidable means with acting surface slidable on said first acting surface of said lock lever by a predetermined stroke for flexing said lock lever at said base section away from said second lock engaging member to thereby release said engagement between said first and second lock engaging members, wherein said second acting surface of said slidable means consists of a single sloping surface and, said first acting surface of said lock lever comprise at least two sloping surfaces having slope angles different to each other; a first sloping surface having a slope angle substantially identical to that of said second acting surface of said slidable means and a second sloping surface having a slope angle less than that of said second sloping surface, thus providing at least two acting surface sections.

* * * * *